US009781186B2

(12) United States Patent
Rosenzweig et al.

(10) Patent No.: US 9,781,186 B2
(45) Date of Patent: *Oct. 3, 2017

(54) CONTENT DELIVERY NETWORK VIDEO CONTENT INVALIDATION THROUGH ADAPTIVE BITRATE MANIFEST MANIPULATION

(71) Applicant: Amazon Technologies, Inc., Reno, NV (US)

(72) Inventors: Jesse J. Rosenzweig, Portland, OR (US); Gregory K. Truax, Portland, OR (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/056,868

(22) Filed: Feb. 29, 2016

(65) Prior Publication Data

US 2016/0323344 A1 Nov. 3, 2016

Related U.S. Application Data

(63) Continuation of application No. 14/716,028, filed on May 19, 2015, now Pat. No. 9,276,983, which is a (Continued)

(51) Int. Cl.
*G06F 15/16* (2006.01)
*H04L 29/06* (2006.01)
(Continued)

(52) U.S. Cl.
CPC .......... *H04L 65/602* (2013.01); *H04L 47/286* (2013.01); *H04L 65/4084* (2013.01);
(Continued)

(58) Field of Classification Search
CPC ............ H04L 65/4084; H04L 67/1095; H04L 41/509; H04L 67/2852
(Continued)

(56) References Cited

U.S. PATENT DOCUMENTS 8,060,613 B2    11/2011   Farber et al.
9,276,983 B2 *   3/2016   Rosenzweig ......... H04L 65/602
(Continued)

FOREIGN PATENT DOCUMENTS

WO     2014/004955     1/2014

OTHER PUBLICATIONS

"Non Final Office Action dated Sep. 11, 2015" received in U.S. Appl. No. 14/716,028.
(Continued)

*Primary Examiner* — David Lazaro
(74) *Attorney, Agent, or Firm* — Hogan Lovells US LLP

(57) ABSTRACT

A method for invalidating content segments of a bitstream. The method comprises a step of delivering a manifest file from an origin server to a content delivery network. The manifest file may have a time-to-live value and may be redelivered based on the time-to-live value. The method comprises a step of delivering one or more content segments from the origin server to the content delivery network. The manifest file may contain pointers to the content segments. The method comprises a step of modifying the manifest file at the origin server to include invalidation information based on an input signal. The method comprises a step of invalidating the content segments throughout the content delivery network based on the invalidation information.

20 Claims, 8 Drawing Sheets

Related U.S. Application Data continuation of application No. 14/702,243, filed on May 1, 2015, now abandoned.

(51) Int. Cl.
| | | |
|---|---|---|
| *H04L 29/08* | (2006.01) | |
| *H04L 12/841* | (2013.01) | |
| *H04N 21/2187* | (2011.01) | |
| *H04N 21/2343* | (2011.01) | |
| *H04N 21/262* | (2011.01) | |
| *H04N 21/845* | (2011.01) | |

(52) U.S. Cl.
CPC ............ *H04L 65/608* (2013.01); *H04L 65/80* (2013.01); *H04L 67/1095* (2013.01); *H04N 21/2187* (2013.01); *H04N 21/23439* (2013.01); *H04N 21/26258* (2013.01); *H04N 21/8456* (2013.01)

(58) Field of Classification Search
USPC ........................................................ 709/230
See application file for complete search history.

(56) References Cited

U.S. PATENT DOCUMENTS

| | | | | |
|---|---|---|---|---|
| 2012/0233228 | A1* | 9/2012 | Barton | .................... H04L 67/06 707/827 |
| 2014/0089465 | A1* | 3/2014 | van Brandenburg | . H04L 65/605 709/217 |
| 2014/0337472 | A1 | 11/2014 | Newton et al. | |
| 2015/0100664 | A1* | 4/2015 | Flack | ..................... H04L 67/28 709/213 |
| 2015/0106841 | A1 | 4/2015 | Wolf | |

OTHER PUBLICATIONS

"Notice of Allowance dated Nov. 4, 2015" received in U.S. Appl. No. 14/716,028.

"International Search Report dated Jul. 29, 2016" received in PCT/US2016/030158.

CDN Interconnection Architecture, European Telecommunications Standards Institute (ETSI), 650, Route Des Lucioles; F-06921 Sophia-Antipolis; France, vol. zArchinve, No. V0.0.7, Nov. 30, 2012 (Nov. 30, 2012), pp. 1-51, XP014179737, (retrieved on Nov. 30, 2012) p. 24, paragraph 6.2.3.5—p. 25, paragraph 6.2.3.5.

Pantos R. et al: HTTP Live Streaming; draft-pantos-http-live-streaming-16.txt, internet engineering task force, IETF; standardworkingdraft, Internet Society (ISOC) 4, Rue Des Falaises CH-1205 Geneva, Switzerland, Apr. 15, 2015 (Apr. 15, 2015), pp. 1-48, XP015105831, (retrieved on Apr. 15, 2015) the whole document.

* cited by examiner

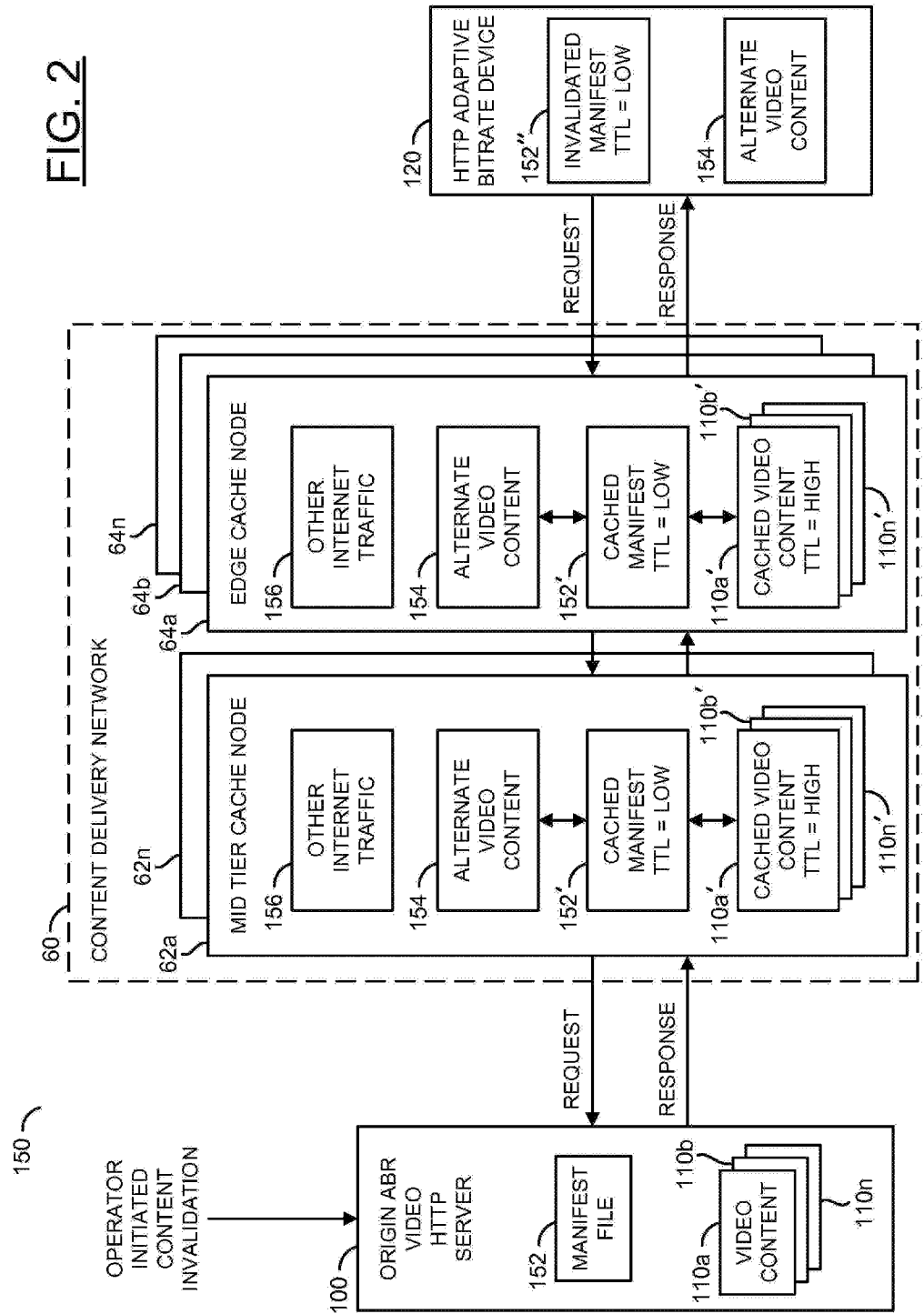

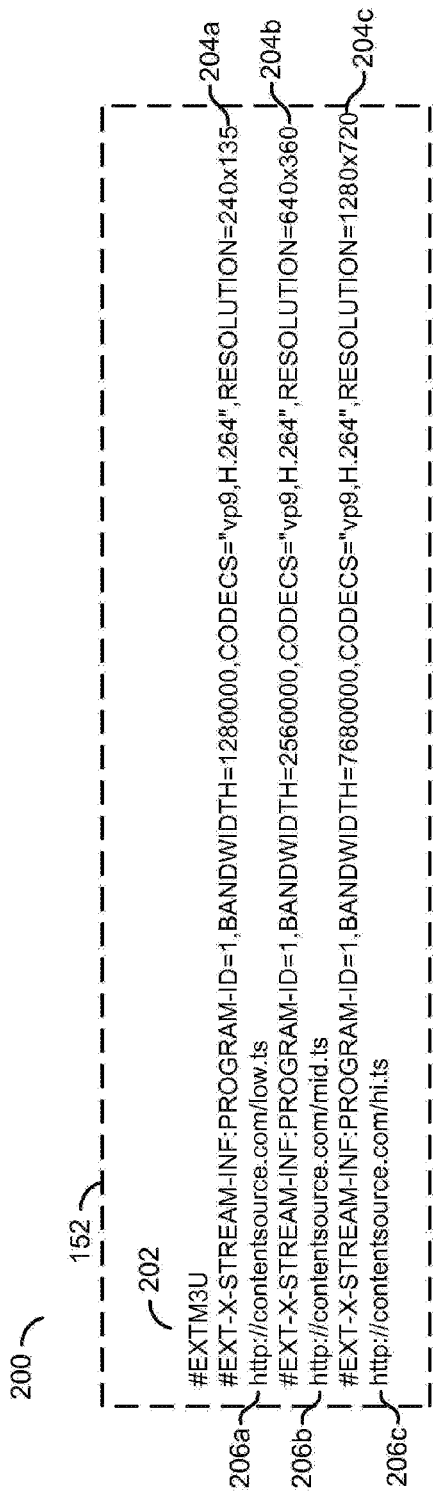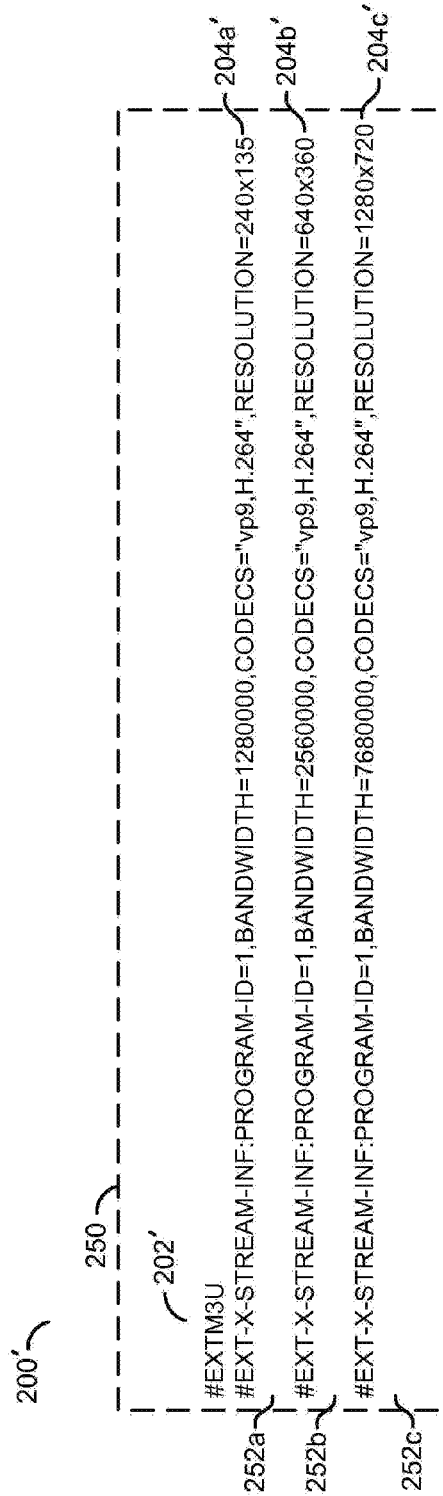

CONTENT DELIVERY NETWORK VIDEO CONTENT INVALIDATION THROUGH ADAPTIVE BITRATE MANIFEST MANIPULATION

CROSS-REFERENCE TO RELATED APPLICATIONS

This application is a continuation of U.S. application Ser. No. 14/716,028, entitled "CONTENT DELIVERY NETWORK VIDEO CONTENT INVALIDATION THROUGH ADAPTIVE BITRATE MANIFEST MANIPULATION," filed May 19, 2015; which is a continuation of U.S. application Ser. No. 14/702,243, entitled "CONTENT DELIVERY NETWORK VIDEO CONTENT INVALIDATION THROUGH ADAPTIVE BITRATE MANIFEST MANIPULATION," filed May 1, 2015, which are incorporated by reference for all purposes.

FIELD OF THE INVENTION

The present invention relates to content delivery generally and, more particularly, to a method and/or architecture for content delivery network video content invalidation through adaptive bitrate (ABR) manifest manipulation.

BACKGROUND OF THE INVENTION

Content Delivery Networks (CDNs) receive content from an origin web server. CDNs contain tiers of caching in order to distribute and store copies of content throughout the network. Adaptive video content may be distributed using standard HTTP methods over traditional CDNs. Client devices using adaptive video bitrate methods generally request a manifest file from the origin server periodically in order to have an accurate list of available video segments. Manifest files get quickly distributed through the network due to a relatively small file size and a short time to live (TTL) property. The TTL property of objects over HTTP is used to ensure certain objects in a network are refreshed. In adaptive video streaming, the manifest file should be refreshed often while the actual video segments do not need to be refreshed often.

CDNs typically support a feature called invalidation. Invalidation is used when content needs to quickly be removed from the network in the case of censoring content, breech in security, invalidating corrupted content, or to purge test content when setting up for a live event. Traditional invalidation uses an out-of-band message to be sent to invalidate content in the caches of the network. A specific object name must be known ahead of time when sending an invalidation command. The command is sent throughout the nodes in the network allowing each node to invalidate the cached content. Completing the invalidation depends on the number of object URLs included in the invalidation request, a time to propagate the invalidation signal and a time to properly invalidate all objects. The invalidation request uses the object names of all the segment files. There may be hundreds or thousands of content segment files cached throughout the network depending on the duration of the video.

It would be desirable to implement content delivery network video content invalidation through ABR manifest manipulation and signaling to provide faster invalidation of objects throughout the network.

SUMMARY OF THE INVENTION

The present invention concerns a method for invalidating content segments of a bitstream. The method comprises a step of delivering a manifest file from an origin server to a content delivery network. The manifest file may have a time-to-live value and may be redelivered based on the time-to-live value. The method comprises a step of delivering one or more content segments from the origin server to the content delivery network. The manifest file may contain pointers to the content segments. The method comprises a step of modifying the manifest file at the origin server to include invalidation information based on an input signal. The method comprises a step of invalidating the content segments throughout the content delivery network based on the invalidation information.

The objects, features and advantages of the present invention include providing a content delivery network video content invalidation that may (i) use ABR manifest manipulation, (ii) quickly allow a video segment to be skipped, (iii) quickly remove a video segment from a live feed, (iv) update in a matter of seconds, (v) switch a feed based on quality of service tests, (vi) perform a live swap out of content, (vii) counteract malicious acts on a network, (viii) divert users to an approved source, (ix) use a manifest file as an invalidating signal, (x) distribute adaptive content, (xi) use standard HTTP methods over traditional content delivery networks, (xii) delete video segments from caches and/or (xiii) leverage the low time to live value of the manifest file.

BRIEF DESCRIPTION OF THE DRAWINGS

These and other objects, features and advantages of the present invention will be apparent from the following detailed description and the appended claims and drawings in which:

FIG. 2 is a block diagram illustrating example network portions;

FIG. 3 is a diagram illustrating an example manifest;

FIG. 4 is a diagram illustrating an example manipulated manifest file pointing to blank content;

DETAILED DESCRIPTION OF THE PREFERRED EMBODIMENTS

Figure 1:
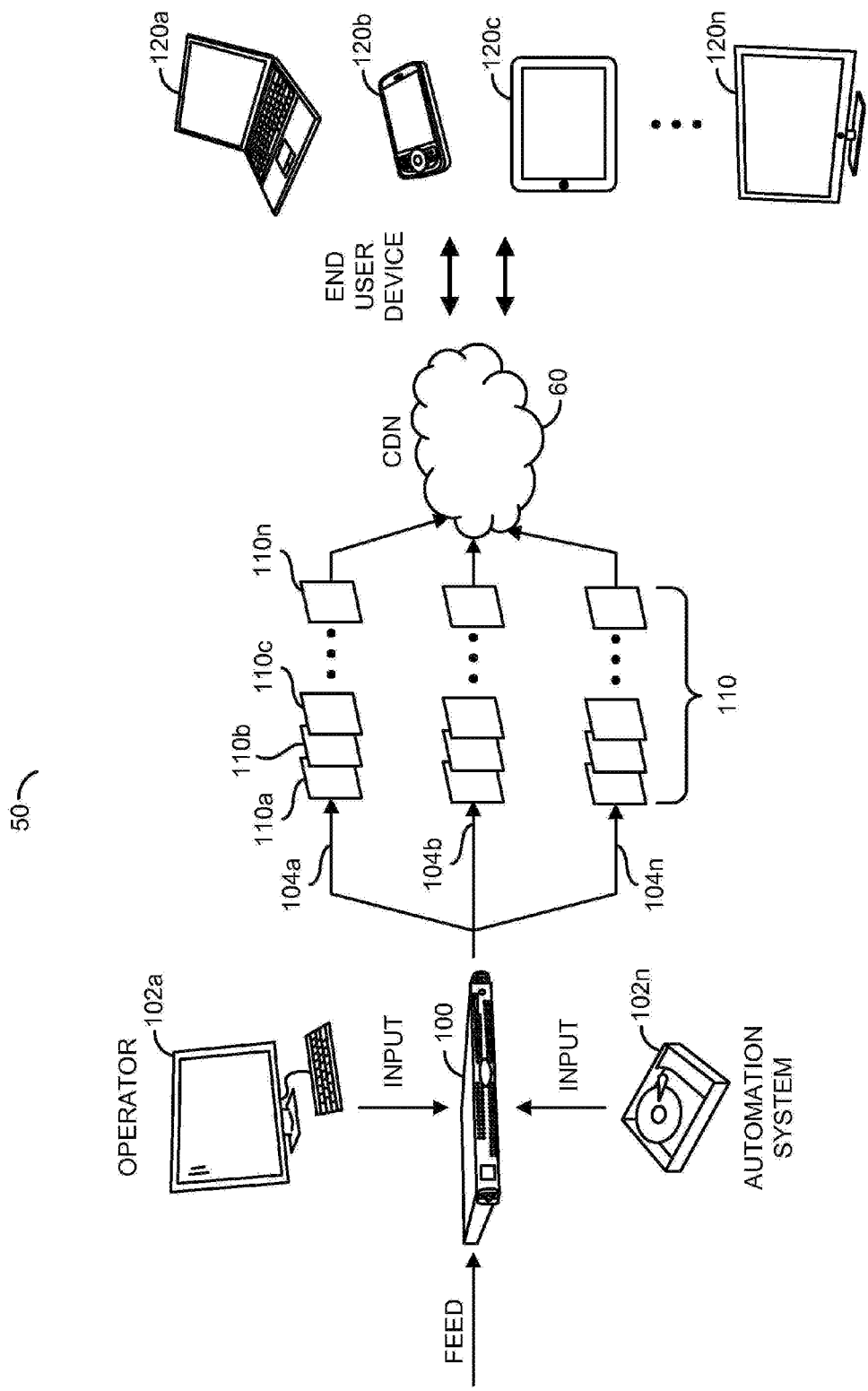
FIG. 1 is a diagram illustrating an example embodiment of an apparatus.

Referring to FIG. 1, an example embodiment (or system) 50 of an apparatus 100 is shown in accordance with a preferred embodiment of the present invention. The system 50 generally comprises the apparatus 100, one or more operator devices (or operators) 102*a*-102*n*, one or more bitstreams (or video signals) 104*a*-104*n*, a content delivery network (or network) 60 and/or one or more end user devices (or client devices) 120*a*-120*n*.

The apparatus 100 may be implemented as an encoder/packager. In some embodiments, the apparatus 100 may be implemented as an origin server. The packager 100 may receive a signal (e.g., FEED). The signal FEED may be a video signal. For example, the signal FEED may be a live stream. The live stream FEED may comprise live video content (e.g., sporting events, concert events, pay-per-view events, etc.), pre-recorded content (e.g., television shows, movies, time-delayed events, sports highlights, etc.) and/or advertisement content (e.g., commercials). The packager 100 may receive one or more input signals (e.g., INPUT) from one or more of the operators 102a-102n. The packager 100 may generate one or more bitstreams 104a-104n.

The operators 102a-102n are shown generating the invalidation signal INPUT. In some embodiments, the operators 102a-102n may be implemented as a single operator 102. For example, the operator 102 may be a user terminal operated by a user. In some embodiments, the operator 102 may be implemented as an automation system. The signal INPUT may be an operator initiated content invalidation.

The bitstreams 104a-104n may be delivered by the encoder/packager 100 to the content delivery network (CDN) 60. The bitstreams 104a-104n may represent various encoded/packaged versions of the signal FEED. For example, the bitstream 104a may be a high resolution and/or high bitrate version of the signal FEED. In another example, the bitstream 104b may be a medium resolution and/or medium bitrate version of the signal FEED. In yet another example, the bitstream 104n may be a low resolution and/or low bitrate version of the signal FEED. In some embodiments, bitstreams 104a-104n may provide alternate audio (e.g., different languages) and/or closed captions. The number and/or types of the bitstreams 104a-104n may be varied according to the design criteria of a particular implementation.

Each of the bitstreams 104a-104n may comprise a number of content segments 110a-110n (e.g., the content segments 110). Each of the content segments 110a-110n may represent a portion of the bitstream 104a-104n. Each of the content segment files 110a-110n may represent one segment of playback time of the program FEED (e.g., 10 second segment files may contain 10 seconds of video and/or audio). For example, when played back sequentially, the content segment s 110a-110n may generate the content of the corresponding bitstream 104. In another example, the content segments 110a-110n may be stored locally on the end user devices 120a-120n (e.g., buffered) and when enough of the content segments 110a-110n are available the end user devices 120a-120n may decode the content segments 110a-110n for playback. The content segments 110a-110n may be adaptive video content. The content segments 110 may allow the bitstream 104 to be delivered over the system 50 efficiently and/or reliably. For example, requesting individual content segments 110 may reduce a chance of download failure by one of the client devices 120a-120n. In another example, storing the content segments 110 across the CDN 60 may reduce an amount of storage needed at each node of the CDN 60.

The CDN 60 may be a network of computers (e.g., servers). Each of the computers of the CDN 60 may be a node. The CDN 60 may store and/or deliver the bitstreams 104a-104n over a wide-area network (e.g., the internet). The CDN 60 may store and/or deliver various content from various sources. The CDN 60 may facilitate delivery of digital content (e.g., the bitstreams 104a-104n) to the various client devices 120a-120n.

The client devices 120a-120n may be configured to send and/or receive data from the CDN 60. The client devices 120a-120n may be end user devices such as desktop computers, television sets, notebook computers, network computers, tablet computing devices, smartphones, media players (e.g., network connected Blu-Ray devices), etc. Generally the client devices 120a-120n are configured to playback adaptive bitrate content (e.g., the bitstreams 104a-104n and/or the content segments 110). For example, the client devices 120a-120n may be configured to decode the bitstreams 104a-104n for playback. The client devices 120a-120n may send requests to the server 100 and receive content based on the sent requests.

Referring to FIG. 2, a block diagram of example network portions 150 of the system 50 is shown. The example network portions 150 may comprise the origin server 100, the CDN 60, and/or the client device 120. The number of devices and/or nodes shown is a representative example. The number of devices, nodes and/or layout of the example network portions 150 may be varied according to the design criteria of a particular implementation.

The encoder/packager 100 is shown as an origin active bitrate video HTTP server. The encoder/packager 100 is shown receiving a signal (e.g., REQUEST) and sending a signal (e.g., RESPONSE). The signal REQUEST may represent a data request (e.g., an HTTP request) from one of the client devices 120a-120n forwarded to the origin server 100 by the CDN 60. For example, the signal REQUEST may be an HTTP request for the origin server 100 to send digital data to one of the client devices 120a-120n. The signal RESPONSE may represent a data response from the origin server 100 to be forwarded by the CDN 60 to one of the client devices 120a-120n. For example, the origin server may send the signal RESPONSE (e.g., data such as the content segments 110) as a network packet based on the HTTP protocol to one of the client devices 120a-120n. The type, implementation and/or number of responses and/or requests may be varied according to the design criteria of a particular implementation.

The origin server 100 is shown comprising a block (or module or file) 152 and the content segments 110a-110n. The block 152 may be a manifest file. The manifest file 152 may provide a list of the available content segments 1101-110n. For example, the manifest file 152 may comprise metadata and/or URLs pointing to the content segments 110 and/or other data. The manifest file 152 may be used by the client devices 120a-120n to request the content segments 110. A format of the manifest file 152 may be varied according to the design criteria of a particular implementation.

The manifest file 152 and/or the content segments 110a-110n may have a respective time-to-live (TTL) value. The TTL value (or property) may be used to ensure certain objects in a network are refreshed. For example, objects in a network may be cached (e.g., throughout the CDN 60). The TTL value may represent an amount of time, a number of requests and/or a hop count before the object is refreshed {e.g., requested/updated from the origin server 100). The TTL value for the manifest file 152 and/or the content segments 110 may be set by the operator 102 and/or set at the origin server 100. In a common CDN 60 implementation, various types of content may remain stored on the CDN until the TTL value expires (e.g., content invalidation may take a long time).

Generally, the TTL value of the manifest file 152 is less than the TTL value of the content segments 110. A lower TTL value for the manifest file 152 may allow the manifest file 152 to be refreshed more frequently/often than the content segments 110 (e.g., to update the pointers to the content segments 110). A comparatively higher TTL value for the content segments 110 may allow the content segments 110 to remain in cache longer (e.g., to reduce a number of requests made to and/or reduce a load on the origin server 100). The implementation and/or values set for the TTL values of the manifest file 152 and/or the content segments 110 may be varied according to the design criteria of a particular implementation.

The CDN 60 generally comprises blocks (or circuits) 62a-62n and/or blocks (or circuits) 64a-64n. The circuits 62a-62n may be implemented as mid tier cache nodes. The circuits 64a-64n may be implemented as edge cache nodes. The mid tier cache nodes and/or the edge cache nodes 64a-64n may be implemented using computing devices (e.g., server computers). The mid tier cache nodes 62a-62n and/or the edge cache nodes 64a-64n may implement the various nodes of the CDN 60. The edge cache nodes 64a-64n may be located relatively close to the client devices 120a-120n in the CDN 60. The number and/or types of nodes of the CDN may be varied according to the design criteria of a particular implementation.

The mid tier cache nodes 62a-62n and/or the edge cache nodes 64a-64n are shown comprising blocks (or modules or files) 110a'-110n', a block (or module or file) 152', a block (or module or file) 154, and/or a block (or module or file) 156. Generally, the mid tier cache nodes 62a-62n and the edge cache nodes 64a-64n store similar content. In some examples, one or more of the mid tier cache nodes 62a-62n and/or one or more of the edge cache nodes 64a-64n may store different versions of similar content (e.g., store cached versions that may be old and/or may have not been updated).

The blocks 110a'-110n' may be cached video content. The cached video content 110a'-110n' is shown having a (relatively) high TTL value. In one example, the cached content 110a'-110n' may be the same as the content segments 110a-110n stored on the origin server 100 (e.g., the cached content 110a'-110n' may not need to be refreshed). In another example, the cached content 110a'-110n' may be different than the content segments 110a-110n (e.g., the content segments 110a-110n have been updated on the origin server 100 but not delivered to the various nodes of the CDN 60).

The block 152' may be a cached manifest file. The cached manifest file 152' is shown having a (relatively) low TTL value. In one example, the cached manifest file 152' may be the same as the manifest file 152 stored on the origin server 100 (e.g., the cached manifest file 152' may not need to be refreshed). In another example, the cached manifest file 152' may be different than the manifest file 152 (e.g., the manifest file 152 may have been updated on the origin server 100 but not delivered to the various nodes of the CDN 60). The cached manifest file 152' may store the invalidation signal. Since the cached manifest file 152' has a low TTL value, the cached manifest file 152' may be updated often.

The block 154 may be alternate video content. The alternate video content 154 may be video content available to the client devices 120a-120n when the content segments 110a-110n are unavailable. For example, the client devices 120a-120n may receive the alternate video content 154 instead of the content segments 110.

The block 156 may represent other internet traffic. For example, the other internet traffic 156 may be content distributed throughout the CDN 60 unrelated to the origin server 100. In some embodiments, the origin server 100 may not be the only source of digital content and/or files for the CDN 60.

The client device 120 is shown as a HTTP adaptive bitrate device. The client device 120 is shown comprising a block (or module or file) 152" and/or the alternate video content 154. The block 152" may be an invalidated manifest file (e.g., a manipulated manifest file). In one example, the invalidated manifest file 152" may point to the alternate video content 154 instead of the content segments 110a-110n. The client device 120 may be configured to request and/or receive the content segments 110 from the CDN 60 using HTTP requests (e.g., the signal REQUEST and/or the signal RESPONSE).

The origin server 100 may be configured to perform a content invalidation. For example, one or more of the content segments 110a-110n may be invalidated. Content invalidation may prevent and/or stop content from being delivered to the client devices 120a-120n. To initiate an invalidation of content the operator 102a-102n may send the invalidation signal INPUT (e.g., the operator initiated content invalidation shown in FIG. 2) to the origin server 100. The origin server 100 may invalidate the content segments 110 by updating (or manipulating) the manifest file 152. For example, the manifest file 152 may be updated to no longer point to the content segments 110.

Since the TTL value for the manifest file 152 is relatively low, the manifest file 152 may be refreshed throughout the CDN 60. For example, the client device 120 may request the manifest file 152 and when the TTL value expires for the cached manifest 152' in the various nodes of the CDN 60, the updated manifest file 152 (e.g., the invalidated manifest 152") may be distributed throughout the CDN to the client device 120. The client device 120 is shown having downloaded the invalidated manifest 152". In the example shown, the invalidated manifest 152" may point to the alternate content 154 instead of the content segments 110. The client device 120 is shown with the alternate content 154 based on the invalidated manifest 152".

In some embodiments, the content segments 110 may still exist on the CDN 60 (e.g., as the cached content 110a'-110n'). However, since the invalidated manifest file 152" no longer points to the cached content 110a'-110n', the client devices 120a-120n may no longer access the invalidated content. The origin server 100 may later redistribute valid versions of the content segments 110a-110n throughout the CDN 60 and update the manifest file 152 to point to the valid versions of the content segments 110a-110n. Generally, the invalidating manifest file 152" is served for at least a length of the TTL value to ensure the new invalidated manifests have been distributed throughout the CDN 60.

A switch of the live feed may be initiated by a user (e.g., the operator 102a) in one example. In another example, a quality of service test may be implemented. For example, if the video stream represented using the content segments 110 was of such a poor quality that an advertiser and/or a broadcaster would not be satisfied, the content segments 110 may be rearranged (e.g., by providing the alternate content 154) and/or removed quickly. For example, if the content segments 110 represent an advertisement of poor quality (e.g., fails the quality of service test), an alternate advertisement could be displayed by invalidating the content segments 110. The content segments 110 may be invalidated automatically if the content segments 110 do not pass the quality of service test.

Generally, the manifest file 152 is pulled through the network 60 by one or more of the end user devices 120a-120n based on HTTP requests. The TTL value states how fresh (e.g., recent) objects are in the various nodes of the CDN 60. When one of the client devices 120a-120n requests the manifest file 152 and the TTL has expired, the servers in the network 60 fetch a fresh object and may go all the way back to the origin 100. The encoder/packager 100 may deliver the manifest file 152 to the CDN 60. The encoder/ packager 100 may redeliver the manifest file 152 (e.g., as a manipulated and/or modified manifest file such as the invalidated manifest 152") based on the TTL value. Since the TTL value of the manifest file 152 is generally less than the TTL value of the content segments 110, the invalidation tends to occur in less time than the expiry of the TTL value of the content segments 110.

Referring to FIG. 3, an example 200 of the manifest file 152 is shown. The manifest file 152 comprises various data. The various data may be a file header 202, metadata 204a-204c and/or pointers/links 206a-206c. The data is shown as human-readable (or generally human-readable) text. In some embodiments, the data may be coded using an encoded format, an encrypted format and/or computer readable (e.g., binary) format. The format of the data in the manifest file may be varied according to the design criteria of a particular implementation.

The file header 202 may provide an indicator to identify the manifest file 152 as a particular type of file. For example, the file header 202 may be used by the origin server 100, the mid tier cache nodes 62a-62n, the edge cache nodes 64a-64n, the client devices 120a-120n and/or any other computing device to recognize the manifest file 152 as a particular type of file (e.g., a pointer file, a manifest file, etc.).

The metadata 204a-204n may be associated with each of the pointers 206a-206n. The metadata 204a-204n may indicate the type of file to be served when following links 206a-206n. For example, the metadata 204a-204n may indicate that the links 206a-206n represent a video stream, a bandwidth needed to playback the content segments 110, the codecs implemented for the content segments 110, the resolution (e.g., in pixels) of the content segments 110 and/or any other relevant data. The type of data available in the metadata 204a-204n may be varied according to the design criteria of a particular implementation.

The pointers 206a-206n may point to various types of stored data. The stored data may be the content segments 110. For example, the pointers 206a-206n are shown as an HTTP URL link. In some embodiments, the pointers 206a-206n may be implemented as a RTMP link and/or an FTP link. The format of the pointers 206a-206n may be varied according to the design criteria of a particular implementation.

The pointers 206a-206c of the manifest file 152 are shown pointing to the content segments 110. The content segments 110 are shown implemented as Transport Stream (e.g., .ts) files. For example, the content segments 110 may comprise MPEG-2 data. In the example 200 shown, the pointers 206a-206c may link to the content segments 110 having various bitrates (e.g., low, medium, high, etc.). For example, the pointers 206a-206c may point to different versions of the same video content and the client devices 120a-120n may receive the content segments 110 from only one of the links 206a-206c (e.g., based on the playback capabilities of the client devices 120a-120n, an authentication of the client devices 120a-120n and/or the bandwidth available to the client devices 120a-120n).

In some embodiments, the manifest file 152 may be embedded within the bitstreams 104a-104n. The apparatus 100 may use the manifest file 152 as an invalidating signal. The manifest file 152 may be a constant signal that gets updated routinely on the CDN 60. The relatively lower TTL value of the manifest file 152 may result in the manifest file 152 updating much quicker than the cache files 110a'-110n'.

The apparatus 100 may use the manifest file 152 as an invalidating signal to point to new content and/or point to no content. For example, by pointing to no content, the client devices 120a-120n may freeze on the last frame (e.g., the last of the content segments 110 received) and depending on the client devices 120a-120n there may be uncertainty regarding whether the client devices 120a-120n could recover. To minimize a likelihood of the client devices 120a-120n freezing (or locking up), a splash screen (e.g., the alternate content 154) may be sent as a notification. For example, the notification may indicate the broadcast will return momentarily.

The type of invalidation and/or recovery may be varied according to the design criteria of a particular implementation. Various examples of invalidation are shown in association with FIGS. 4-6. The type of invalidation may be based on the invalidation information (e.g., instructions) provided in the invalidation signal INPUT. For example, the signal INPUT may be a content invalidation signal initiated by the operator 102.

Referring to FIG. 4, an example 200' of a manipulated manifest file 250 pointing to blank content is shown. The manifest file 250 may be an example of the invalidated manifest file 152". The manifest file 250 is shown having the header 202', the metadata 204a'-204c' and/or the blank content pointers 252a-252c.

The invalidating signal INPUT from the operator 102 may provide instructions to delete and/or initiate a deletion of the pointers 206a-206n. Replacing the pointers 206a-206n with the blank content pointers 252a-252n may update the manifest file 152 to the invalidated manifest file 152". For example, when the client devices 120a-120n receive the manifest file 250, links to the content segments 110 may not be available (e.g., the blank content pointers 252a-252n). In some embodiments, the metadata 204a'-204n' may be deleted and/or replaced with blank and/or placeholder data. While the blank content pointers 252a-252n are shown as blank lines in the manifest file 250, other indications may be used (e.g., placeholder data, a 'NO DATA' message, etc.).

Figure 5:
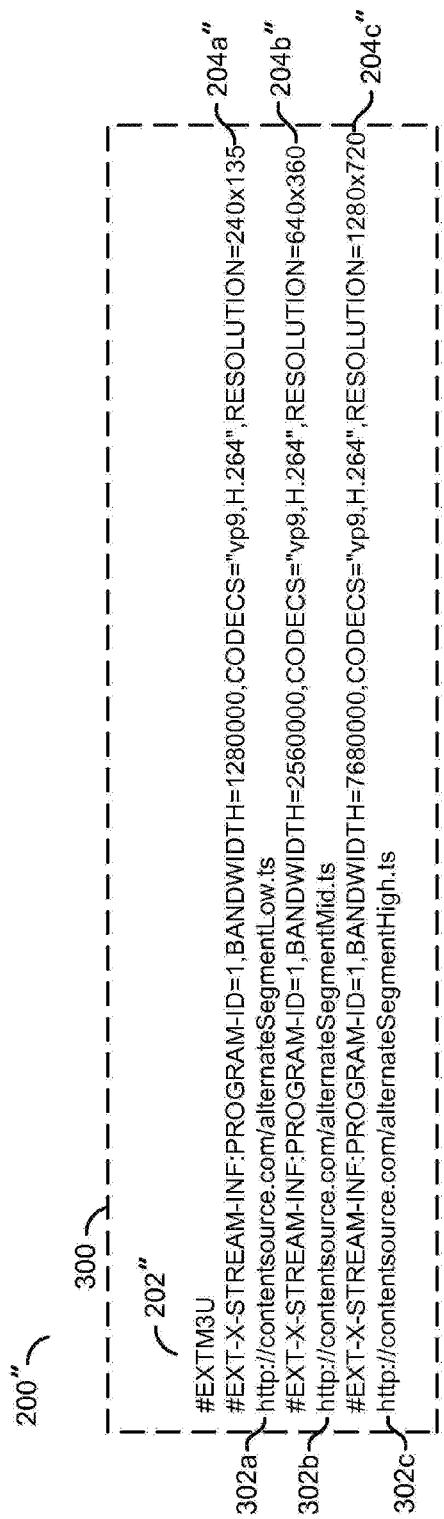
FIG. 5 is a diagram illustrating an example manipulated manifest file pointing to alternate content.

Referring to FIG. 5, an example 200" of a manipulated manifest file 300 pointing to alternate content is shown. The manifest file 300 may be an example of the invalidated manifest file 152". The manifest file 300 is shown having the header 202", the metadata 204a"-204c" and/or the alternate content pointers 302a-302c.

The invalidating signal INPUT from the operator 102 may provide instructions to replace and/or initiate a replacement of the pointers 206a-206n. Replacing the pointers 206a-206n with the alternate content pointers 302a-302n may update the manifest file 152 to the invalidated manifest file 152". In one example, the invalidation information may be URL pointers. For example, when the client devices 120a-120n receive the manifest file 300, links to the content segments 110 may not be available (e.g., the alternate content pointers 302a-302n are available). Instead, the alternate content pointers 302a-302n may redirect the client devices 120a-120n to request the alternate video content 154. In some embodiments, the metadata 204a'-204n' may be replaced with metadata corresponding to the alternate content 154 and/or placeholder data.

Figure 6:
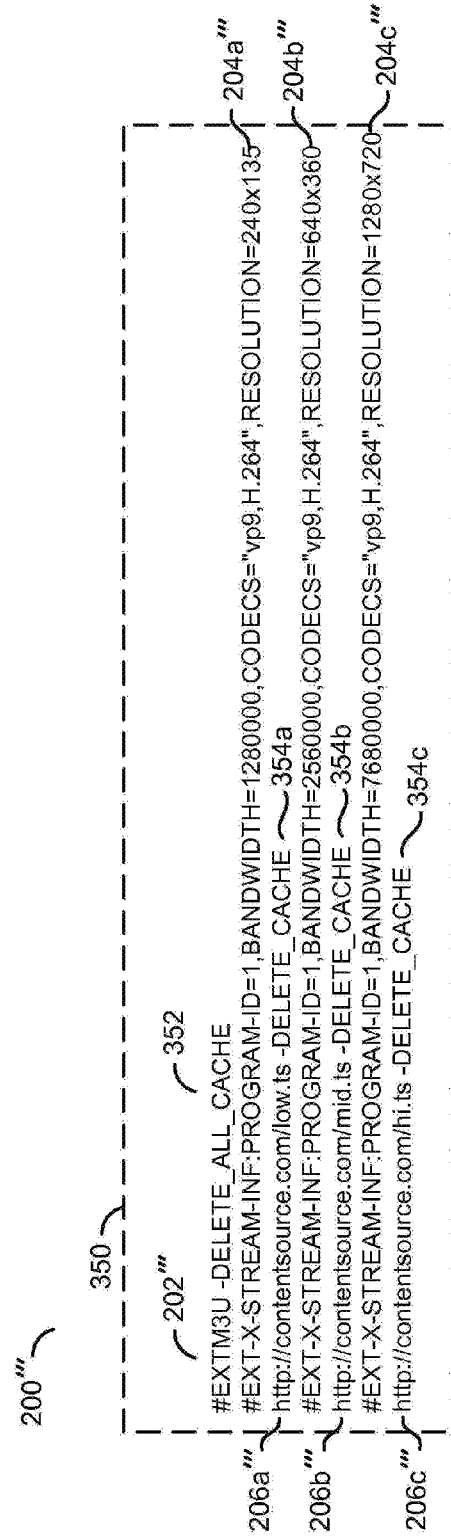
FIG. 6 is a diagram illustrating an example manipulated manifest file with deletion parameters.

Referring to FIG. 6, an example 200''' of a manipulated manifest file 350 having deletion parameters is shown. The manifest file 350 may be an example of the invalidated manifest file 152". The manifest file 350 is shown having the header 202''', the metadata 204a'''-204c''', the pointers 206a'''-206c''', the delete all parameter 352 and/or the content deletion parameters 354a-354c.

The invalidating signal INPUT from the operator 102 may provide instructions to add and/or initiate an addition of the delete all parameters 352 and/or the content deletion parameters 354a-354n. Adding the parameters 352 and/or 354a-354n may update the manifest file 152 into the invalidated manifest file 152". In some embodiments, only the delete all parameter 352 may be needed. In some embodiments, one or more of the deletion parameters 354a-354n may be used for a corresponding one of the pointers 206a'''-206n'''. Generally, when the delete all parameter 352 is added, the deletion parameters 354a-354n are not needed (e.g., redundant). The parameters 352 and/or 354a-354n may be implemented as a parameter (e.g., an addition to a line associated with the pointers 206a'''-206n''') and/or a command line switch. The implementation of the delete all parameter 352 and/or the deletion parameters 354a-354n may be varied according to the design criteria of a particular implementation.

The parameters 352 and/or 354a-354n may be implemented to delete the cached video content 110a'-110n' from the CDN 60. For example, the CDN 60 may receive the manipulated manifest file 350. The nodes of the CDN 60 may read the manipulated manifest file 350 and detect the parameters 352 and/or 354a-354n. The nodes of the CDN 60 may physically delete, purge and/or remove the cached video content 110a'-110n' based on the parameters 352 and/or 354a-354n. After deletion and/or removal, the cached video content 110a'-110n' may no longer be available.

Figure 7:
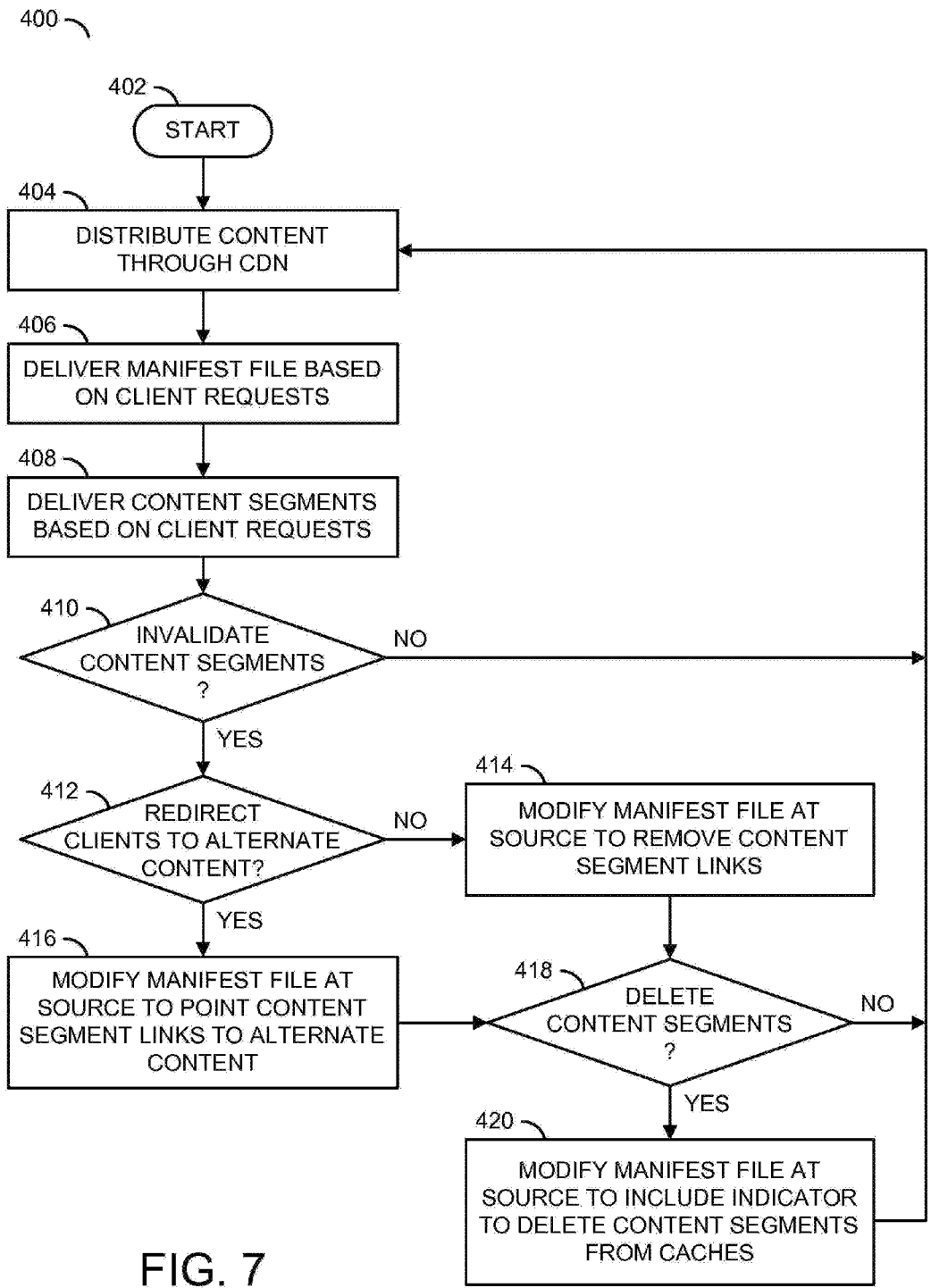
FIG. 7 is a flow diagram illustrating a method for invalidating content segments at an origin server.

Referring to FIG. 7, a method (or process) 400 is shown. The method 400 may invalidate the content segments 110 at an origin server 100. The method 400 generally comprises a step (or state) 402, a step (or state) 404, a step (or state) 406, a step (or state) 408, a decision step (or state) 410, a decision step (or state) 412, a step (or state) 414, a step (or state) 416, a decision step (or state) 418, and a step (or state) 420.

The state 402 may be a start step. The state 404 may distribute the content 110 through the content delivery network 60. The state 406 may deliver the manifest file 152 based on one or more requests from a client (e.g., the client devices 120a-120n). The step 408 may deliver one or more of the content segments 110 based on requests from the clients 120a-120n. Next, the method 400 may move to the decision state 410.

The decision state 410 may determine if one or more of the segments 110 need to be invalidated. If not, the method 400 moves back to the state 404. If so, the method 400 moves to the decision state 412. The decision state 412 determines whether a client (e.g., one of the clients 120a-120n) needs to be redirected to the alternate content 154. If not, the method 400 moves to the state 414. If so, the method 400 moves to the state 416.

The state 414 may be used to modify the manifest file 152 at the source 100 to remove one or more of the content segment links (e.g., the pointers 206a-206c). After the state 414, the method 400 moves to the decision state 418. The state 416 modifies the manifest file 152 at the source 100 to point one or more of the content segment links (e.g., the alternate content pointers 302a-302n) to the alternate content 154. The method 400 then moves to the decision state 418. The decision state 418 determines if one or more of the content segments 110 need to be deleted. If not, the method 400 returns to the state 404. If so, the method 400 moves to the state 420. The state 420 modifies the manifest file 152 at the source 100 to include an indicator (e.g., the delete all parameter 352 and/or the deletion parameters 354a-354c) to delete the content segments 110 from the caches (e.g., the mid-tier cache nodes 62a-62n and/or the edge cache nodes 64a-64n).

Figure 8:
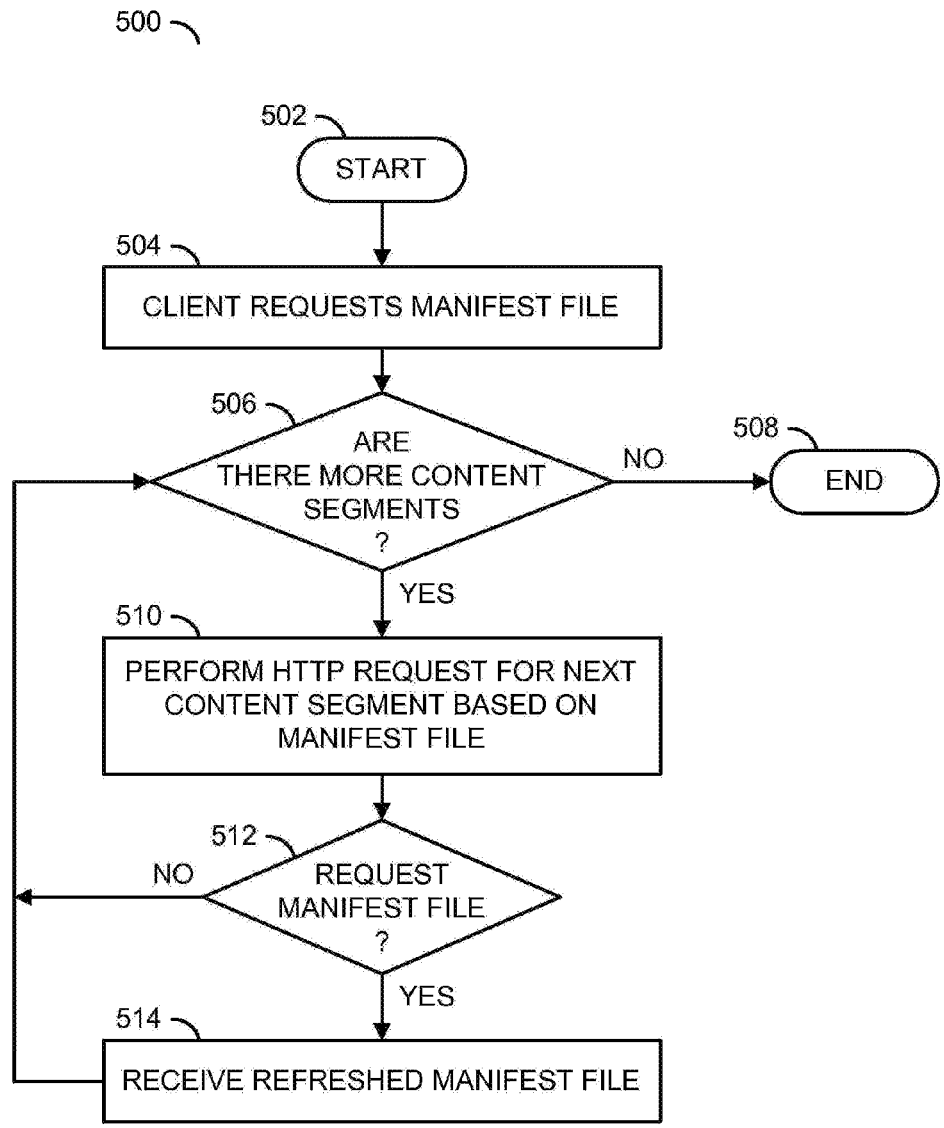
FIG. 8 is a flow diagram illustrating a method for invalidating content segments at a client device.

Referring to FIG. 8, a method (or process) 500 is shown. The method 500 may invalidate the content segments 110 at the client device 120. The method 500 generally comprises a step (or state) 502, a step (or state) 504, a decision step (or state) 506, a step (or state) 508, a step (or state) 510, a decision step (or state) 512, and a step (or state) 514. The state 502 may be a start step. In the state 504, the client 120 may request the manifest file 152. The state 506 may determine if there are more content segments 110. If not, the method 500 ends at the state 508. If so, the method 500 moves to the state 510.

The state 510 may perform an HTTP request for the next content segment based on the manifest file 152 (e.g., the links 206a-206c). Next, the method 500 moves to the decision state 512. The decision state 512 determines if a request has been made for the manifest file 152. If not, the method 500 moves back to the decision state 506. If so, the method 500 moves to the state 514. The state 514 receives a refreshed manifest file (e.g., for example, one of the manipulated manifest files 250, 300 and/or 350). The method 500 then returns to the decision state 506.

Figure 9:
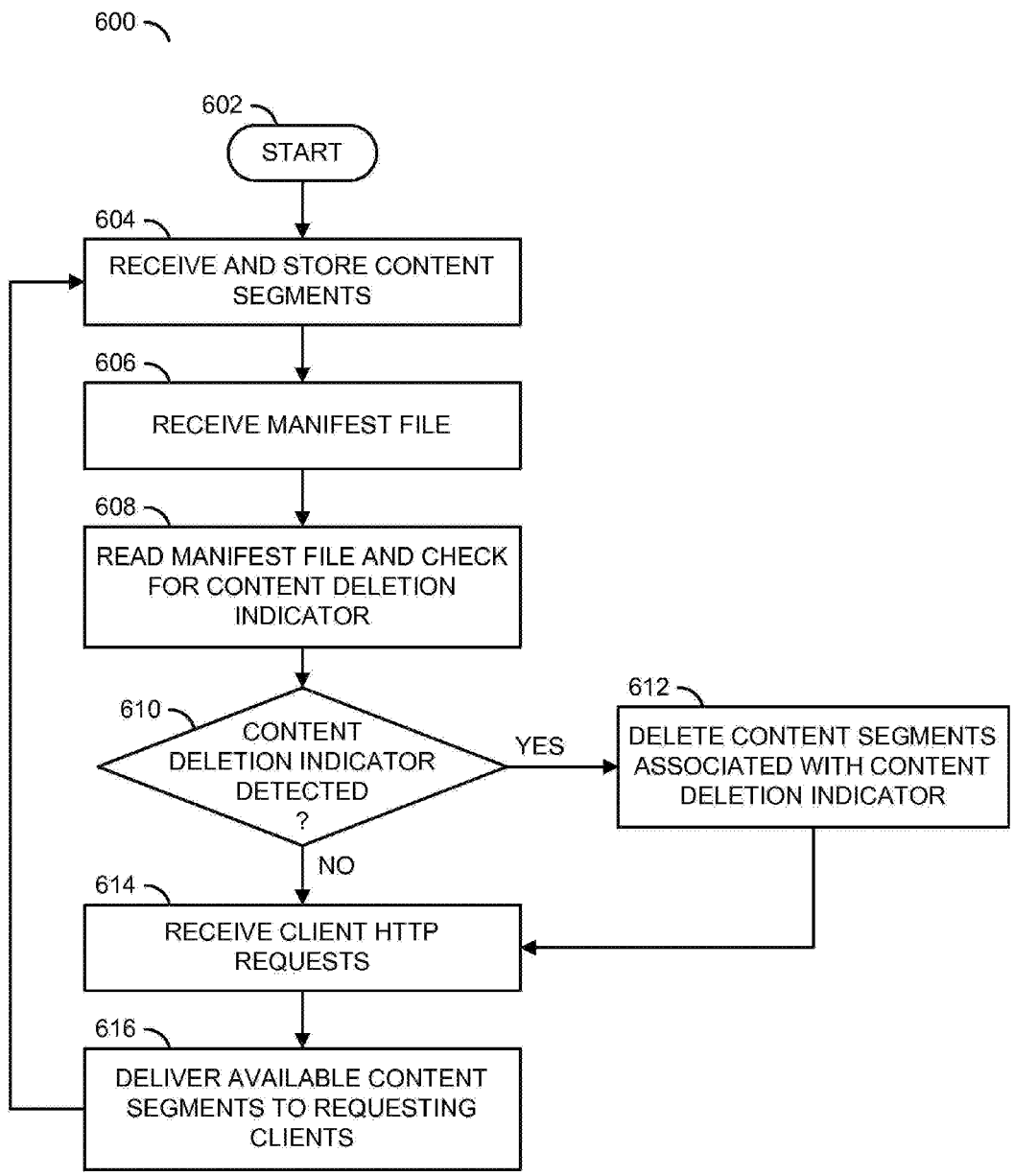
FIG. 9 is a flow diagram illustrating a method for invalidating content segments in a content delivery network.

Referring to FIG. 9, a method (or process) 600 is shown. The method 600 may invalidate the content segments 110 in the client delivery network 60. The method 600 generally comprises a step (or state) 602, a step (or state) 604, a step (or state) 606, a step (or state) 608, a decision step (or state) 610, a step (or state) 612, a step (or state) 614, and a step (or state) 616. The state 602 may be a start step. In the state 604, the CDN 60 may receive and/or store the content segments 110. In the state 606, the CDN 60 may receive the manifest file 110. The step 608 may read the manifest file 152 and check for a content deletion indication (e.g., the delete all parameter 352 and/or the deletion parameters 354a-354c). Next, method 600 may move to the decision state 610.

The decision state 610 determines if a content deletion indicator has been detected. If so, the method 600 moves to the state 612. If not, the method 600 moves to the state 614. The state 612 deletes one or more content segments 110 associated with the content deletion indicator. Next, the method 600 moves to the state 614. In the state 614, the method 600 receives client HTTP requests (e.g., the signal REQUEST). Next, the state 616 delivers available content segments 110 to the requesting clients 120a-120n. The method 600 then moves back to the state 604.

Figure 10:
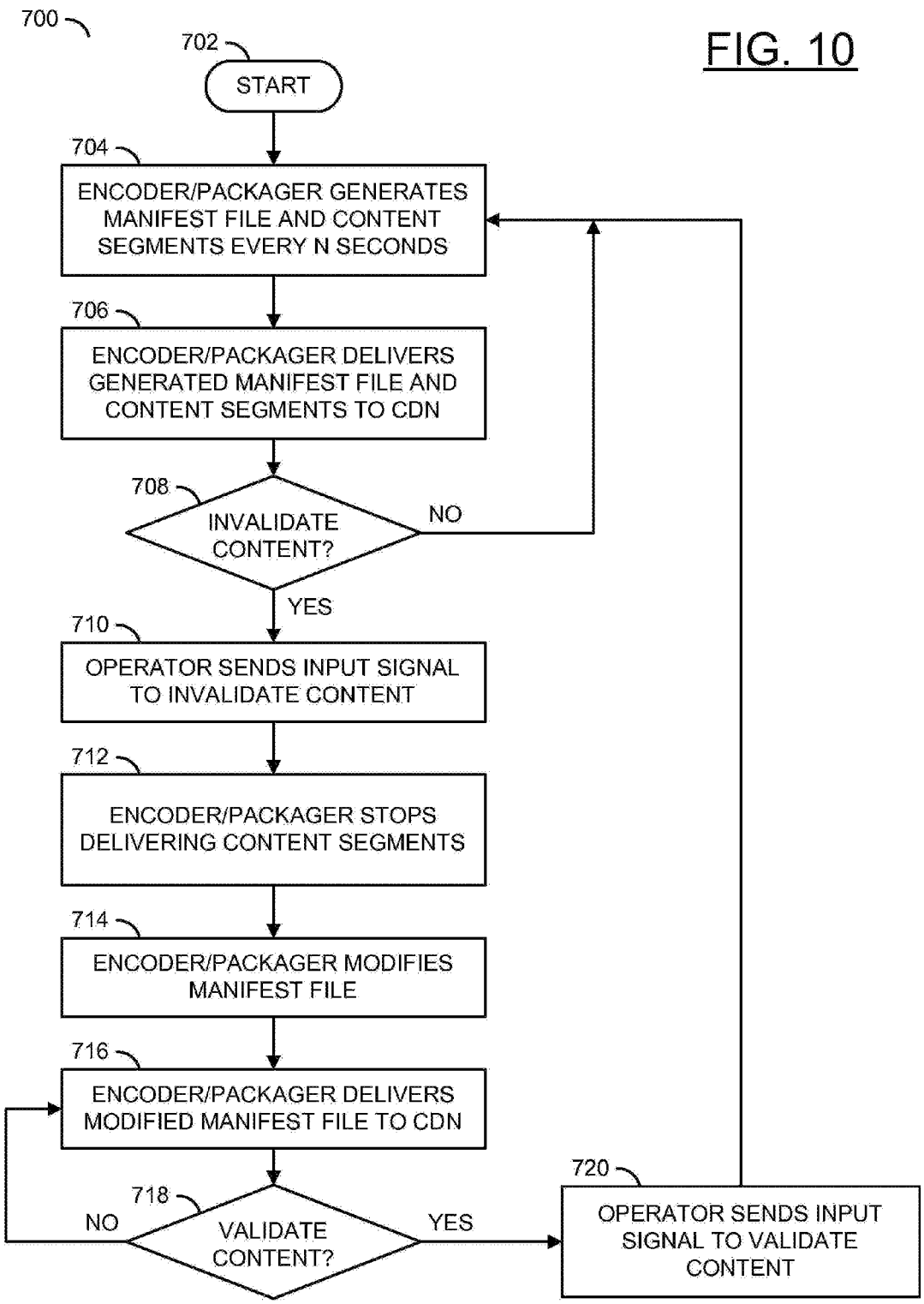
FIG. 10 is a flow diagram illustrating a method for invalidating content segments by an operator.

Referring to FIG. 10, a method (or process) 700 is shown. The method 700 may invalidate the content segments 110 by the operator 102. The method 700 generally comprises a step (or state) 702, a step (or state) 704, a step (or state) 706, a decision step (or state) 708, a step (or state) 710, a step (or state) 712, a step (or state) 714, a step (or state) 716, a decision step (or state) 718, and a step (or state) 720. The state 702 may be a start step. The state 704 instructs the encoder/packager 100 to generate the manifest file 152 and the content segments 110 every n seconds. Next, the state 706 instructs the encoder/packager 100 to deliver the generated manifest file 152 and the content segments 110 to the content delivery network 60. Next, the method 700 moves to the decision state 708.

In the decision state 708, the operator 120 determines if the content 110 should be invalidated. If not, the method 700 moves back to the state 704. If so, the method 700 moves to the state 710. The state 710 generates an input signal (e.g., the invalidation signal INPUT) to invalidate the content 110 based on input from the operator 102. Next, the state 712 instructs the encoder/packager 100 to stop delivering the content segments 110. Next, the state 714 instructs the encoder/packager 100 to modify the manifest file 152 (e.g., such as the modifications shown in one of the manipulated manifest file examples 250, 300 and/or 350). Next, the state 716 instructs the encoder/packager 100 to deliver the modified manifest file to the content delivery network 60. Next, the method 700 moves to the decision state 718.

In the decision state 718, the operator 102 determines whether the content 110 should be validated. If not, the method 700 moves back to the state 716. If so, the method 700 moves to the state 720. The state 720 allows the operator 120 to send an input signal to validate the content 110. The method 700 then moves back to the state 704.

The apparatus 100 may be used to quickly skip and/or otherwise purge one or more of the content segments 110a-110n during a live feed (e.g., a broadcast). Using the apparatus 100 may allow the content segments 110a-110n to be skipped without updating the cached content 110a'-110n' (e.g., which may involve moving potentially very large video files) and/or without waiting for the TTL value of the cached content 110a'-110n' to expire (e.g., a high TTL value compared to the TTL value of the cached manifest file 152'). For example, the TTL value of the cached video content 110a'-110n' may take around 10 minutes to expire before an update of the cached content 110a'-110n' may be initiated. When the apparatus 100 uses the manifest file 152 as an invalidating signal (e.g., the invalidated manifest 152"), the cached content 110a'-110n' may be invalidated in a matter of 10 seconds or less (e.g., by removing and/or redirecting the pointers 206a-206n). In some embodiments, the cached content 110a'-110n' may still be stored in the CDN 60 (e.g., but not accessible since the invalidated manifest 152" does not point to the cached content 110a'-110n'). In some embodiments, the cached content 110a'-110n' may be deleted from the CDN 60 (e.g., the invalidated manifest 152" has the parameters 352 and/or 354a-354n).

The apparatus 100 may be configured to counteract potential malicious acts to a network. For example, if a DNS attack occurred, where users (e.g., using the client devices 120a-120n) were diverted to a different source (e.g., malicious content), the apparatus 100 may be used to redirect back to a safe source. The apparatus 100 may update the manifest file 152 to redirect the users back to the safe source and the low TTL value may allow the updated manifest file 152" to be refreshed quickly throughout the CDN 60. In another example, the apparatus 100 may be used to redirect to safe content when the live feed contains age inappropriate content (e.g., excessive violence, nudity, inappropriate language, etc.).

In some embodiments, the apparatus 100 may be used to implement a live swap out of the content segments 110. For example, in an advertisement application, there may be a situation where an incorrect ad/commercial was inserted (e.g., the ad may be the completely wrong ad and/or not an age appropriate ad). In some embodiments, if the client devices 120a-120n have controls (e.g., parental controls), the apparatus 100 may swap out content that does not comply with the control settings and divert to a new stream (e.g., an age appropriate stream). For example, the client devices 120a-120n may act as one of the operators 102 to send an invalidation signal if the content segments are determined to not comply with the controls (e.g., a parent may send an invalidation signal when the content segments 110 do not comply with the selected parental controls).

The apparatus 100 may invalidate the content segments 110 quickly through the modification of the manifest file 152. Since the manifest file 152 is constantly being requested by the client devices 120a-120n, the manifest file 152 maybe distributed quickly through the CDN 60. Any updated information in the manifest file 152, such as the invalidation signal, may be distributed quickly through the CDN 60. When one of the client devices 120a-120n requests the content 110 that has been invalidated, the manifest files 152 may be modified (e.g., just in time) to remove the content links 206a-206n and/or point the content links to a slate image and/or stock video footage (e.g., the alternate content 154) to allow the client devices 120a-120n to continue to play back content and give the user a better experience.

In some embodiments, a signal (e.g., the parameters 352 and/or 354a-354n) may be passed through the manifest file 152 to nodes in the CDN 60. The parameters 352 and/or 354a-354n may indicate to the nodes of the CDN 60 to physically delete the video segments out of the caches. The parameters 352 and/or 354a-354n may be in the form of a string and/or sequence of bytes to represent that the content should also be removed by caching systems and/or the edge nodes 64a-64n of the network 60. For example, the mid tier cache nodes 62a-62n and/or edge nodes 64a-64n may be configured to watch and/or scan for the parameters 352 and/or 354a-354n in the manifest files 152 before passing the content segments 110 on to the client devices 120a-120n requesting the content segments 110.

When the operator 102 is satisfied that the content segments 110 have been invalidated, a new manifest may be created at the origin server 100 to resume programming (e.g., distribute the bitstreams 104a-104n) and/or distribute a new program (e.g., a new signal FEED). For example, the manifest file 152 may implement a validation signal.

The apparatus 100 may quickly invalidate video content segments 110 through the use of manifest manipulation. The invalidated manifest 152" may be used to signal an invalidation and/or a purging of the cached content segments 110a'-110n' in the caching nodes 62a-62n and/or the edge nodes 64a-64n. Since the manifest file 152 may have a small TTL value, the updated invalidated manifest 152" may be distributed quickly throughout the CDN 60.

The use of the invalidated manifest 152" by the apparatus 100 may allow the operator 102 to invalidate the content segments 110. The invalidated manifest file 152" allows the content segments 110 to be invalidated without contacting an operator of the CDN 60 to perform an invalidation request. The apparatus 100 may be configured to offer the client devices 120a-120n a slate and/or stock video (e.g., the alternate content 154) during the invalidation/purge phase.

The apparatus 100 may allow the operator 102 to invalidate all content segments 110a-110n for a given output filter using manifest manipulation. The invalidation message is optionally also sent to the CDN 60 being used for content purging. In some embodiments, when the content purge is complete, the output filter may be automatically restarted (e.g., the client devices 120a-120n may automatically resume playback of the bitstreams 104a-104n). In some embodiments, the bitstreams 104a-104n may be in a disabled state until the user re-enables playback.

The apparatus 100 may provide fast, on request, in-band invalidation of the content segments 110 (the cached video content 110a'-110n') through the network 60. Generally, only nodes that are actively serving the clients 120a-120n need to have content invalidated. The invalidation through manifest manipulation allows the end user devices 120a-120n to display a slate and/or a video (e.g., the alternate content segments 154) telling a user about an availability of the content 110 (e.g., that there has been a service interruption and/or that the service will be back soon).

The apparatus 100 may be configured to perform active content invalidation for the CDN 60 through manifest manipulation (e.g., updating the manifest file 152 to the invalidated manifest file 152"). For example, the invalidated manifest file 152" may perform invalidation using one or more of the methods shown in the example manipulated manifest files 250, 300 and/or 350 (e.g., the blank content pointers 206a-206n, the alternate content pointers 302a-302n, the delete all parameter 352 and/or the content deletion parameters 354a-354n). Setting the TTL value for the manifest file 152 is important since the invalidation signal is piggy backing onto the manipulated manifest file 152".

The blank content pointers 206a-206n and/or the alternate content pointers 302a-302n may be included in the invalidation information. Invalidating the content 110 using invalidation by manipulating the blank content pointers 206a-206n and/or the alternate content pointers 302a-302n may result in the content 110 still existing in the CDN 60, but the content 110 may be unable to be served. Invalidating the content 110 and deleting the content 110 by using the delete all parameter 352 and/or the content deletion parameters 354a-354n may result in the content 110 being physically deleted out of down-stream caches (e.g., the mid tier cache nodes 62a-62n and/or the edge cache nodes 64a-64n). For example, the content segments 110 may be deleted (e.g., removed and/or purged) from the CDN 60 due to content censoring, a security breach, content corruption (e.g., the content fails the quality of service test) and/or a purge test.

The functions performed by the diagrams of FIGS. 7-10 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which maybe a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. A method comprising:
receiving, by a content delivery network, one or more content segments from a content source;
receiving, by the content delivery network, manifest data from the content source, the manifest data including one or more pointers to the one or more content segments;
determining, by the content delivery network, the manifest data includes invalidation information, wherein the invalidation information provides instructions for invalidating at least one of the one or more pointers by redirecting requests to alternate content segments; and
deleting, by the content delivery network, at least one content segment based on the invalidation information.

2. The method of claim 1, further comprising:
storing the one or more content segments at a plurality of nodes.

3. The method of claim 2, wherein determining the manifest data includes invalidation information, further comprises:
reading the invalidation information by the plurality of nodes; and
detecting an invalidation parameter associated with the at least one content segment.

4. The method of claim 3, wherein deleting at least one content segment based on the invalidation information, further comprises:
deleting the at least one content segment by each of the plurality of nodes.

5. The method of claim 1, wherein the manifest data includes a time-to-live value set at the content source and is received based on said time-to-live value.

6. The method of claim 5, wherein a content segment is associated with a second time-to-live value, the second time-to-live value being less than the time-to-live value of the manifest data.

7. The method of claim 1, wherein the content segments are adaptive video content.

8. A system comprising:
a processor; and
a memory device including instructions that, when executed by the processor, cause the system to:
receive one or more content segments from a content source;
receive manifest data from the content source, the manifest data including one or more pointers to the one or more content segments;
determine the manifest data includes invalidation information, wherein the invalidation information provides instructions for invalidating at least one of the one or more pointers by redirecting requests to alternate content segments; and
delete at least one content segment based on the invalidation information.

9. The system of claim 8, wherein the instructions, when executed by the processor, further cause the system to:
store the one or more content segments at a plurality of nodes.

10. The system of claim 9, wherein the instructions to determine the manifest data includes invalidation information, when executed by the processor, further cause the system to:
read the invalidation information by the plurality of nodes; and
detect an invalidation parameter associated with the at least one content segment.

11. The system of claim 10, wherein the instructions to delete at least one content segment based on the invalidation information, when executed by the processor, further cause the system to:
delete the at least one content segment by each of the plurality of nodes.

12. The system of claim 8, wherein the manifest data includes a time-to-live value set at the content source and is received based on said time-to-live value.

13. The system of claim 12, wherein a content segment is associated with a second time-to-live value, the second time-to-live value being less than the time-to-live value of the manifest data.

14. The system of claim 8, wherein the content segments are adaptive video content.

15. A system comprising:
a computing device processor; and
a memory device including instructions that, when executed by the computing device processor, cause the system to:
deliver manifest data from an origin server to a content delivery network;
deliver one or more content segments from the origin server to the content delivery network, the manifest data including one or more pointers to the one or more content segments;
modify the manifest data at the origin server to generate modified manifest data that includes invalidation information based on an input; and
invalidate the content segments throughout the content delivery network based on the invalidation information, wherein the invalidation information provides instructions for invalidating at least one of the one or more pointers by redirecting requests to alternate content segments.

16. The system of claim 15, wherein the manifest data includes a time-to-live value set at the origin server and is redelivered based on said time-to-live value.

17. The system of claim 16, wherein a content segment is associated with a second time-to-live value, the second time-to-live value being less than the time-to-live value of the manifest data.

18. The system of claim 15, wherein the time-to-live value results in the manifest data being refreshed throughout the content delivery network more often than the one or more content segments.

19. The system of claim 15, wherein the invalidation information provides instructions for deleting the content segments from the content delivery network.

20. The system of claim 15, wherein the content segments are adaptive video content.

* * * * *